United States Patent
Graenz et al.

(10) Patent No.: US 10,948,089 B2
(45) Date of Patent: Mar. 16, 2021

(54) CONTROL VALVE

(71) Applicant: SAMSON AG, Frankfurt am Main (DE)

(72) Inventors: Daniel Graenz, Eschborn (DE); Johannes Jantz, Schmitten (DE); Michael Merscher, Rodermark (DE); Andreas Reinthaler, Wiesbaden (DE); Tobias Welsch, Niddatal (DE)

(73) Assignee: SAMSON AG, Frankfurt am Main (DE)

( * ) Notice: Subject to any disclaimer, the term of this patent is extended or adjusted under 35 U.S.C. 154(b) by 243 days.

(21) Appl. No.: 16/151,630

(22) Filed: Oct. 4, 2018

(65) Prior Publication Data

US 2019/0186639 A1 Jun. 20, 2019

(30) Foreign Application Priority Data

Oct. 6, 2017 (DE) ...................... 10 2017 123 308.3

(51) Int. Cl.
| | | |
|---|---|---|
| *F16K 1/48* | (2006.01) | |
| *F16K 3/26* | (2006.01) | |
| *F16K 3/314* | (2006.01) | |
| *F16B 9/00* | (2006.01) | |

(52) U.S. Cl.
CPC .............. *F16K 1/487* (2013.01); *F16K 3/267* (2013.01); *F16K 3/314* (2013.01); *F16B 9/052* (2018.08)

(58) Field of Classification Search
CPC .......... F16K 1/487; F16K 3/314; F16K 3/267; F16K 1/482; F16K 47/04; F16B 9/052
See application file for complete search history.

(56) References Cited

U.S. PATENT DOCUMENTS

| | | | | |
|---|---|---|---|---|
| 4,274,433 | A * | 6/1981 | Schnall | .................... F16K 3/267 |
| | | | | 137/454.6 |
| 2014/0014865 | A1* | 1/2014 | Anderson | ............... F16K 3/243 |
| | | | | 251/213 |

FOREIGN PATENT DOCUMENTS

| | | | | |
|---|---|---|---|---|
| CN | 104653796 | * | 5/2015 | |
| WO | WO-2017021243 A1 | * | 2/2017 | ............. F16K 1/487 |

* cited by examiner

*Primary Examiner* — Marina A Tietjen
(74) *Attorney, Agent, or Firm* — Woodling, Krost and Rust (57) ABSTRACT

The invention relates to a control valve for adjusting a process fluid flow of a process plant, comprising a valve housing (4) with a valve seat (10) and a valve piston (12) connected to a valve rod (14), which valve piston (12) interacts with the valve seat (10) for opening and closing the control valve (2). The invention is characterized in that, for connecting the valve rod (14) to the valve piston (12), a flange (22) is mounted on the valve rod (14), which flange (22) is screwed to the valve piston (12) via plural threaded connecting elements (34; 48).

12 Claims, 6 Drawing Sheets

CONTROL VALVE

The foreign priority of German patent application, Germany no. 10 2017 123 308.3, filed Oct. 6, 2017, is hereby incorporated herein by reference hereto.

The invention relates to a control valve, in particular to the connection between a valve rod and a valve piston/throttle body.

Disclosed in WO 2009076068 A1 is a device for aligning a closure member and a valve stem for use with valves. An exemplary valve comprises a stem and a closure member having a first opening for 15 receiving at least a portion of the stem therein. The valve further comprises a positioning member having a first portion and a second portion. The first portion has a first cross-section and the second portion has a second cross-section that is larger than the first cross-section, and a region between the first portion and the second portion forms a positioning surface for aligning the stem and the closure member.

In the device disclosed in WO 2009/076068 A1, the valve rod is guided from above into the central bore of the valve piston/closure member. The arrangement is centered by means of cylindrical sections on the valve rod and on the valve piston. At the end of the conical section on the valve rod, there is a cylindrical threaded stud. A nut is used to connect the valve piston/valve rod connection. The force is 25 transmitted from the valve rod to the valve piston via a single threaded connection and is therefore susceptible to failure. In addition, to tighten the nut on heavy control valves that use very large and heavy valve piston/valve rod assemblies, lifting equipment must be used for lifting the parts in order to lift the valve piston/valve rod assembly to be able to tighten the nut.

US 2009-0025795 A1 discloses a device for connecting a valve stem to a valve plug. The device comprises a threaded valve rod which is mounted in a threaded hole in a valve plug, and a weld received in an adjacent opening that extends from at least one of said threaded openings across an outer surface of said valve stem so as to secure said thread against rotation between said valve rod and said valve piston.

This object is accomplished by the characterizing features of claim 1 in combination with the features of its preamble.

The sub-claims define an advantageous further development of the invention.

It is the object of the invention to provide a control valve having connecting means connecting the value piston to the valve rod, which connecting means provides improved force transfer from the valve rod to the valve piston.

For this purpose, the control valve according to the invention for adjusting a process fluid flow of a process plant, comprising a valve housing with a valve seat and a valve piston which is connected to a valve rod and cooperates with the valve seat for opening and closing the control valve, is characterized in that, for connecting the valve rod to the valve piston, a flange is mounted on the valve rod, which flange is screwed to the valve piston via a plurality of threaded connecting elements, with said connecting elements being in particular arranged distributed on a bolt circle on the flange. It is advantageous here for the force from the valve rod to be transmitted to the valve piston via said plurality of connecting elements threaded to the valve piston, thus resulting in an improved transmission of force.

In addition, the torque required to tighten the threaded connections can be kept so low that a fitter will be able generate the required torque with easy-to-use tools, which means that the connecting means can also be mounted on large valves with comparatively little effort.

It is advantageous for the flange and the valve rod to be connected to each other via a threaded connection between the flange and the valve rod. The connection is advantageously designed in such a way that additional flattening (milling) on the valve rod is avoided, so that the valve rod can be produced on a simple lathe in one operation only, if possible.

In an advantageous embodiment of the control valve, the flange has threaded holes, the piston crown has bores aligned with the threaded holes in the flange, and the threaded connecting elements for connecting the valve piston to the valve rod are screwed into the threaded holes from the side of the piston crown. The use of multiple bolted connections compared to a single central nut reduces tightening torque and thus facilitates assembly.

As an alternative to the above embodiment of the control valve, the flange has bores, the piston crown has threaded holes aligned with the bores in the flange and the threaded connecting elements for screwing the valve piston to the valve rod are screwed into the threaded holes from the flange side. In this embodiment, assembly is facilitated not only by the use of multiple bolts compared to a single central nut, but also by the fact that assembly can be carried out from above, so that the valve rod and the valve piston do not have to be lifted during assembly, which is particularly advantageous for large control valves.

In an advantageous embodiment of the control valve, the flange is fixed to the valve rod by a welded joint, said welded joint comprising at least one weld seam, in particular a weld bead, and/or a weld spot. The welded joint prevents the flange from becoming detached from the valve rod during assembly and also prevents rotation between the flange and the valve rod during operation.

In another advantageous embodiment of the control valve, the flange has a shoulder reduced in diameter which forms an annular shoulder, and said at least one welded joint, which fixes the flange to the valve rod as an anti-rotation device, is provided between the annular shoulder and the valve rod.

The shoulder advantageously acts to reduce the heat input on the flange as a result of the welding process.

It is also advantageous for the valve rod to be centered towards the valve piston by means of a central fitting bore in the valve piston and a cylindrical section on the valve rod. This design also contributes to the fact that the valve rod can be produced on a simple lathe in one single operation only, if possible.

In an advantageous embodiment, for mounting purposes, the flange and the valve piston are secured against rotation by at least one pin inserted in corresponding bores in the flange and in the piston crown, whereby the threaded holes and the associated bores are aligned. During operation, this advantageously contributes to reducing stress on the threaded connections between the flange and the valve rod in operation, and to reducing any impact of the play on the threaded connections.

Corresponding dowel pins can also be used to limit radial play of the combination of flange and valve piston.

According to another advantageous embodiment of the control valve, a centering cone is provided on the valve rod and a conical bore is provided on the flange so as to secure the threaded connection between the flange and the vale rod, with the result that the centering cone will be clamped against the conical bore when the valve rod is being screwed into the flange.

In an alternative embodiment, to secure the threaded connection between the flange and the valve rod, a snap ring is provided in grooves on the valve rod and/or on the annular shoulder of the flange, which snap ring is dimensioned such that it will snap into the grooves in the valve rod and in the flange after the flange has been screwed to the valve rod.

In another alternative embodiment, at least one radially aligned grub screw is provided that engages in a respective groove on the valve rod which is associated with the grub screw, and is screwed into a respective threaded hole through the annular shoulder of the flange.

According to yet another alternative embodiment, at least one threaded rod is provided that is adapted to engage in a recess on the valve rod, which recess is delimited by a secant to the valve rod, said threaded rod being screwed into a threaded hole each through the annular shoulder of the flange.

According to another embodiment, a toothed section with external toothing is provided on the valve rod, a ring gear part with internal toothing matching the external toothing and a locking pin on the flange are provided on the flange. When the locking pin is fitted, it will engage with a recess in the ring gear part, thus locking the later, with the external toothing of the toothed section of the valve rod meshing with the internal toothing of the ring gear part once the control valve has been mounted.

Additional advantages, features and possible applications of the present invention can be gathered from the description which follows, in which reference is made to the embodiments illustrated in the drawings.

Throughout the description, the claims and the drawings, those terms and associated reference characters are used as are indicated in the List of Reference Characters which follows below. In the drawings

Figure 1:
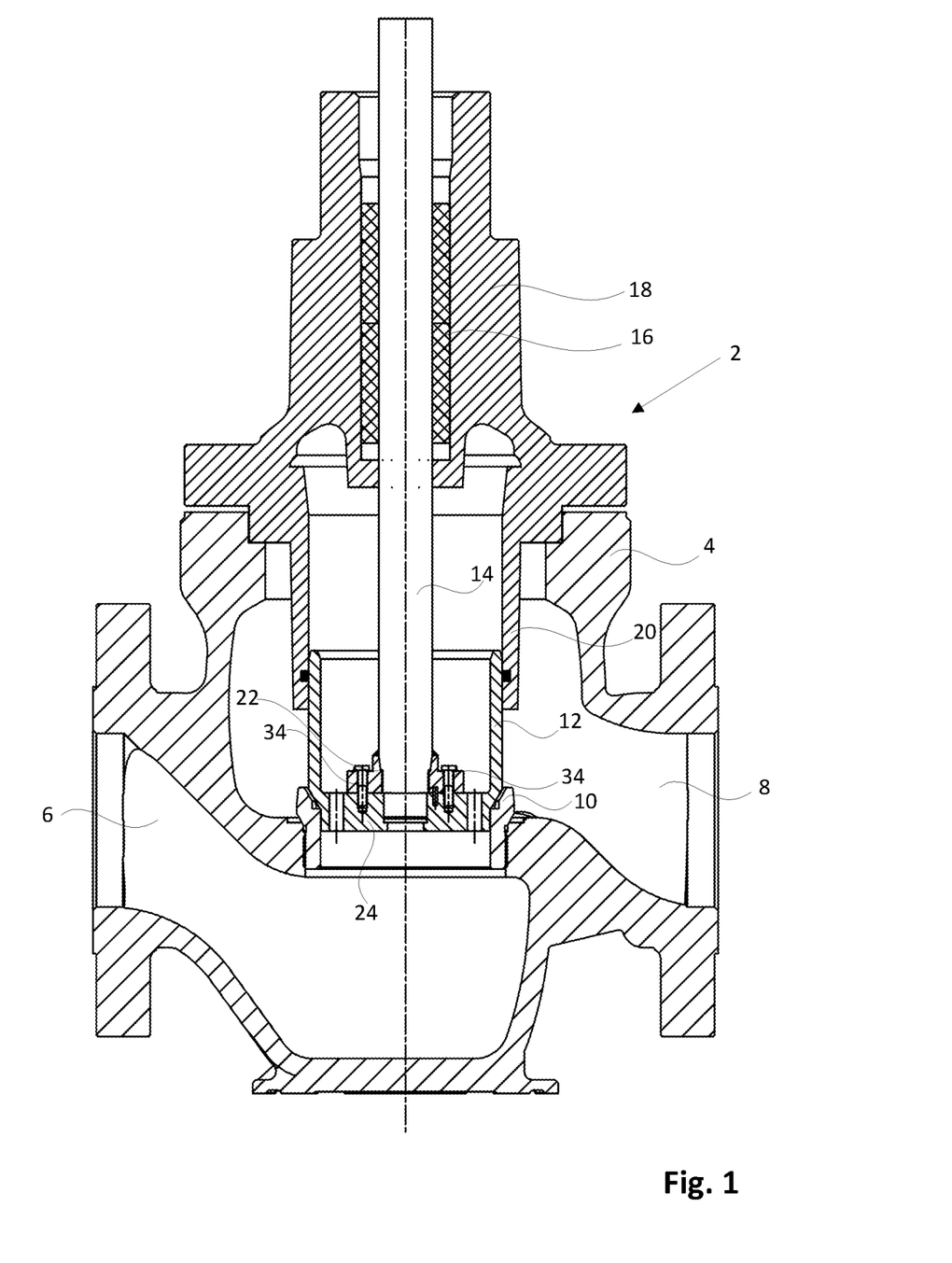
FIG. 1 is a sectional view of a control valve according to the invention.

The control valve 2 shown in the drawings comprises a valve housing 4 having an inlet 6 and an outlet 8 and a valve seat 10 which can be closed or opened by a valve piston 12 and which is actuated by a valve rod 14 connected to the valve piston 12 and to the actuating drive. For this purpose, the valve rod 14 is mounted on a cover 18 via a stuffing box 16 and a guide projection 20 on the cover 18 of the control valve 2.

Figure 2:
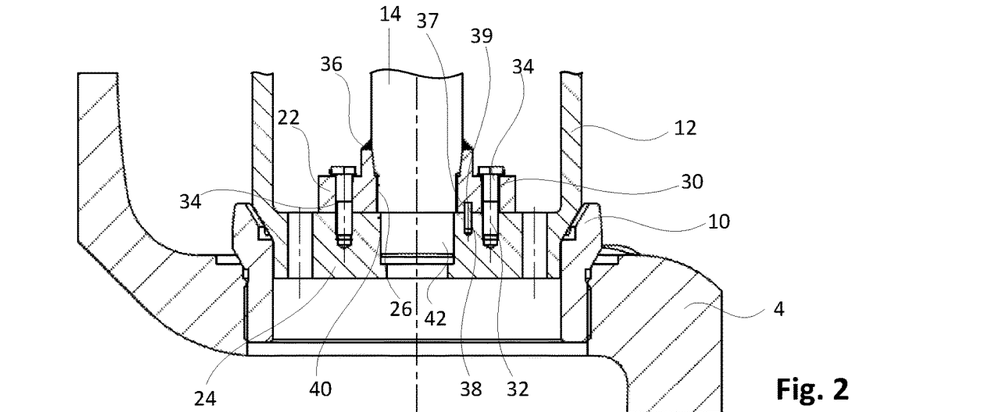
FIG. 2 is a sectional view of a detail of an inventive control valve according to a first embodiment of the invention.

FIG. 2 is an enlarged view of the flange 22 which is secured on the valve rod 14 against rotation relative to the valve rod 14. The flange 22 is connected to the valve rod 14 by a threaded connection 26. The flange 22 and the piston crown 24 of the valve piston 12 are connected to each other by a number of threaded bolts 34 which are distributed over a bolt circle on the flange 22 and/or the piston crown 24.

The flange 22 has a bore 30 and the piston crown 24 has a threaded hole 32 into which the threaded bolts 34 have been screwed for screwing the valve piston 12 to the valve rod 14. As seen in FIGS. 1 and 2, the threaded bolts 34 are screwed into the threaded hole 32 in the piston crown 24 from above, i.e. from the side of the flange 22 facing away from the piston crown 24, through the bore 30 in the flange 22.

The flange 22 has a shoulder 33 reduced in diameter which forms an annular shoulder 35. At least one weld 36 is provided between the annular shoulder 35 and the valve rod 14 so as to fix the flange to the valve rod 14 as an anti-rotation lock. The weld 36 is formed by at least one weld bead or by one or plural welding spots. In addition, the flange 22 and the valve piston 12 are secured against rotation by at least one dowel pin 38 which is inserted in the corresponding bores 37, 39 in the flange 22 or in the piston crown 24.

The valve rod 14 is centered towards the valve piston 12 by means of a central fitting bore 40 in the valve piston 12 and/or in the piston crown 24 and a cylindrical section 42 of the valve rod 14 on the piston end of the valve rod 14.

In the description which follows, all parts that correspond to parts of the control valve shown in FIG. 1 are designated using the same reference characters.

Figure 3:
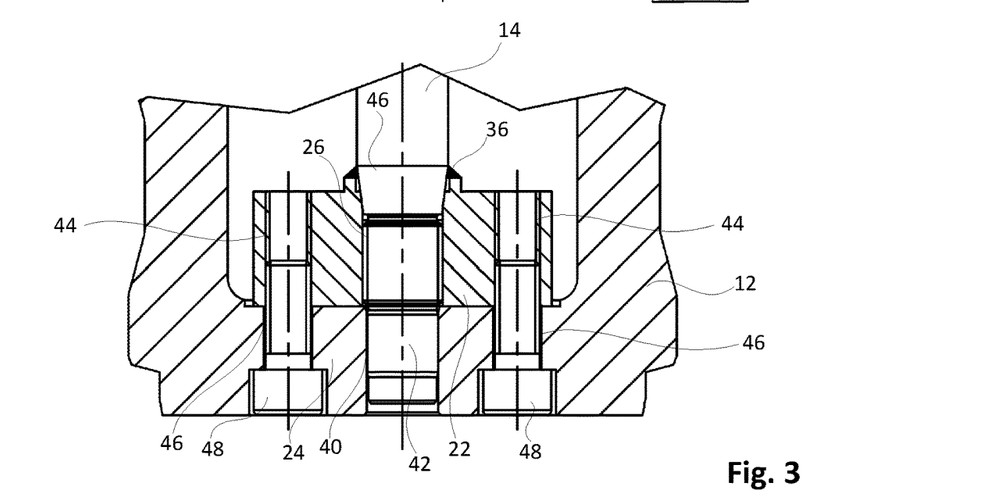
FIG. 3 is a sectional view of a detail of an inventive control valve according to a second embodiment of the invention.

FIG. 3 is a sectional view of a detail of an inventive control valve according to a second embodiment of the invention. In the control valve of FIG. 3, the flange 22 has 44 threaded holes 44 distributed over a bolt circle and the piston crown 24 has bores 46 that are aligned with the threaded holes 44 in the flange 22. The threaded bolts 48 for screwing the valve piston 12 to the valve rod 14 are screwed into the threaded holes 44 from the side of the piston crown 24.

Figure 4:
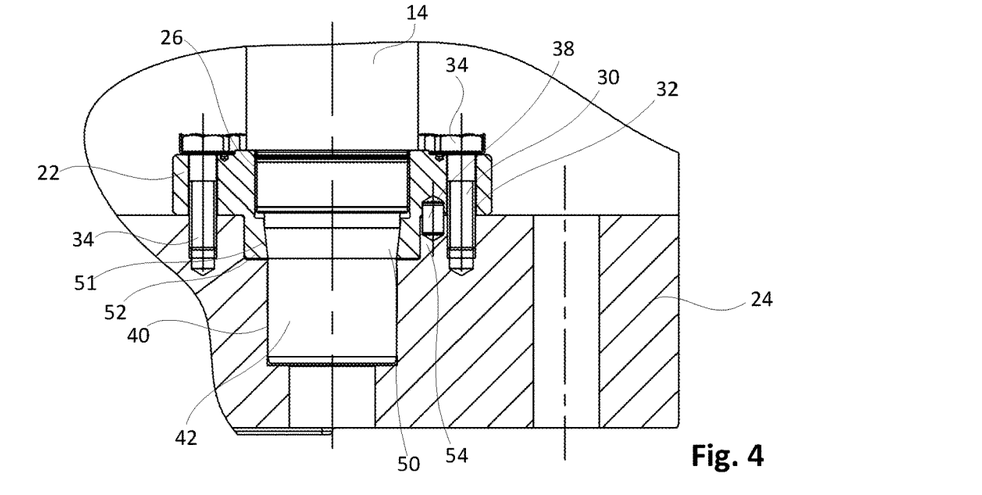
FIG. 4 is a sectional view of a detail of an inventive control valve according to a third embodiment of the invention.

FIG. 4 is a sectional view of a detail of an inventive control valve according to a third embodiment of the invention, in which the valve rod 14 is secured against rotation relative to the flange 22 by a centering cone 48 on the valve rod 14 and a conical bore 50 on the flange 22, in that the centering cone 48 will be braced against the conical bore 50 when the valve rod 14 is being screwed into the flange 22. The conical bore 50 on the flange 22 is arranged in an annular shoulder 52 of the flange 22, which annular shoulder 52 will be accommodated in a corresponding recess 54 in the piston crown 24 once the flange 22 has been mounted. The annular shoulder 52 on the flange 22 leaves sufficient space for the threaded connection 26 between the valve rod 14 and the flange 22.

Figure 5:
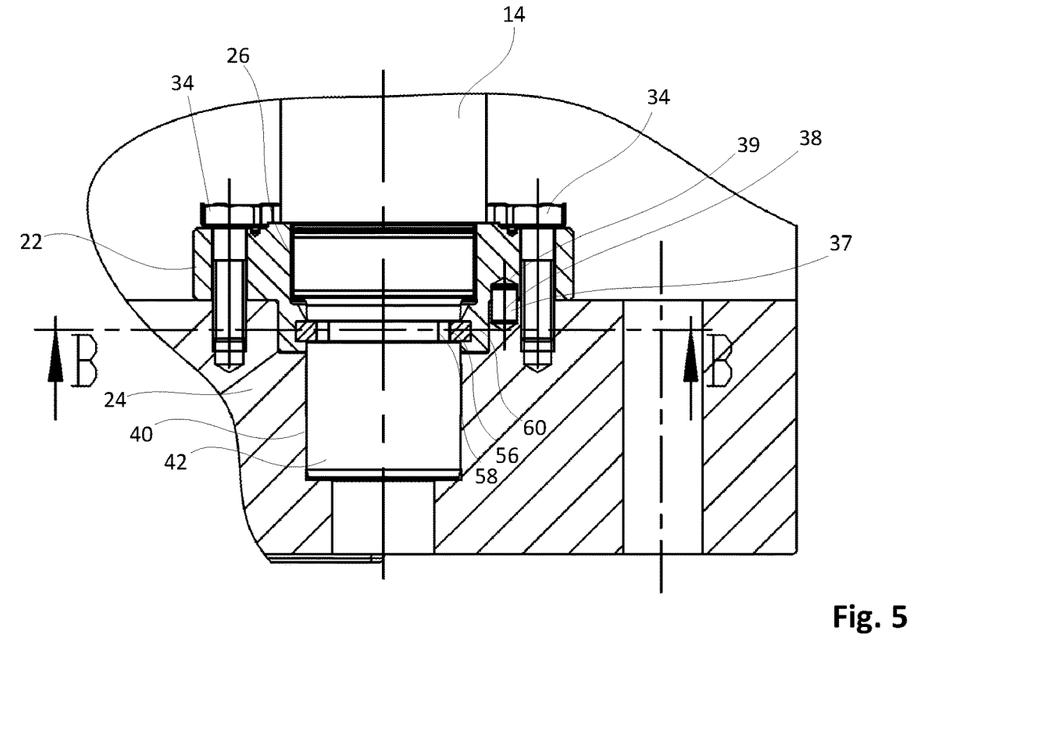
FIG. 5 is a sectional view of a detail of an inventive control valve according to a fourth embodiment of the invention.
Figure 6:
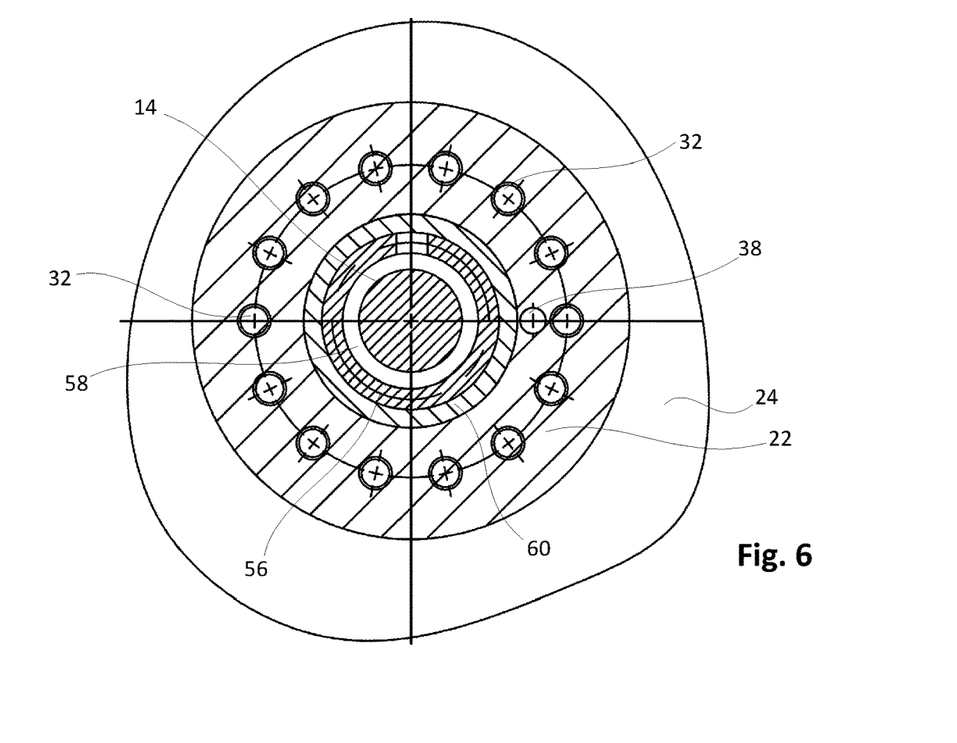
FIG. 6 is a sectional view, taken along line B-B of FIG. 5, of an inventive control valve according to the fourth embodiment of the invention.

FIGS. 5 and 6 are a sectional view of a detail of a control valve according to the invention, and a sectional view, taken along line B-B of FIG. 5, of an inventive control valve according to the fourth embodiment of the invention, respectively. To secure the threaded connection 26 between the flange 22 and the valve rod 14, a snap ring 56 is provided in a groove 58 on the valve rod 14 or in a groove 60 in the annular shoulder 52 of the flange 22, which ring will snap into the grooves 58, 60 in the valve rod 14 and in the flange 22 ater the flange 22 has been screwed to the valve rod 14, thus securing the connection between the flange 22 and the valve rod 14.

Figure 7:
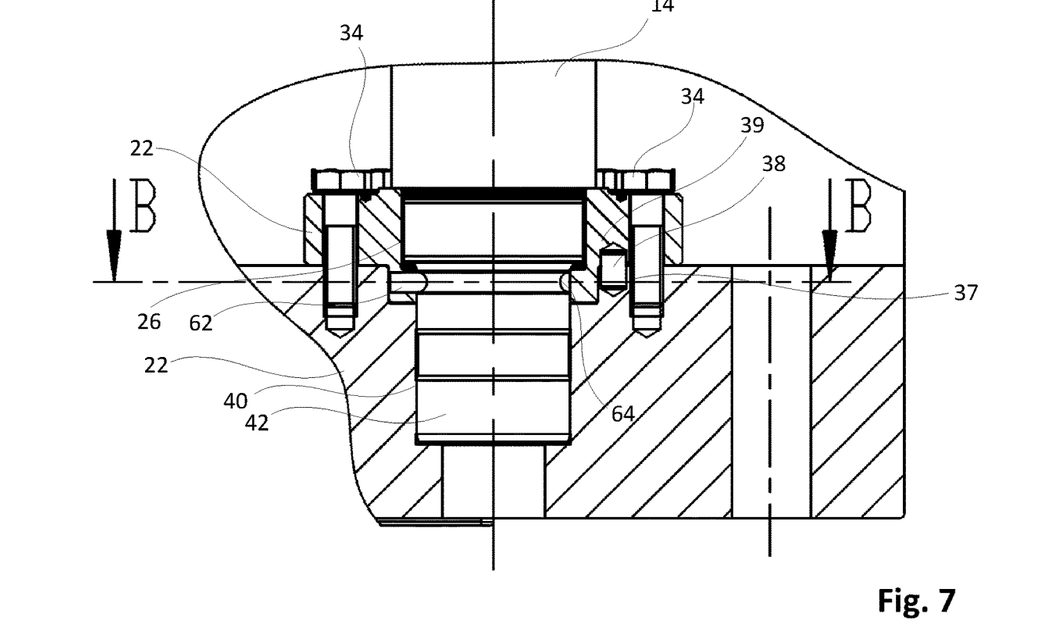
FIG. 7 is a sectional view of a detail of an inventive control valve according to a fifth embodiment of the invention.
Figure 8:
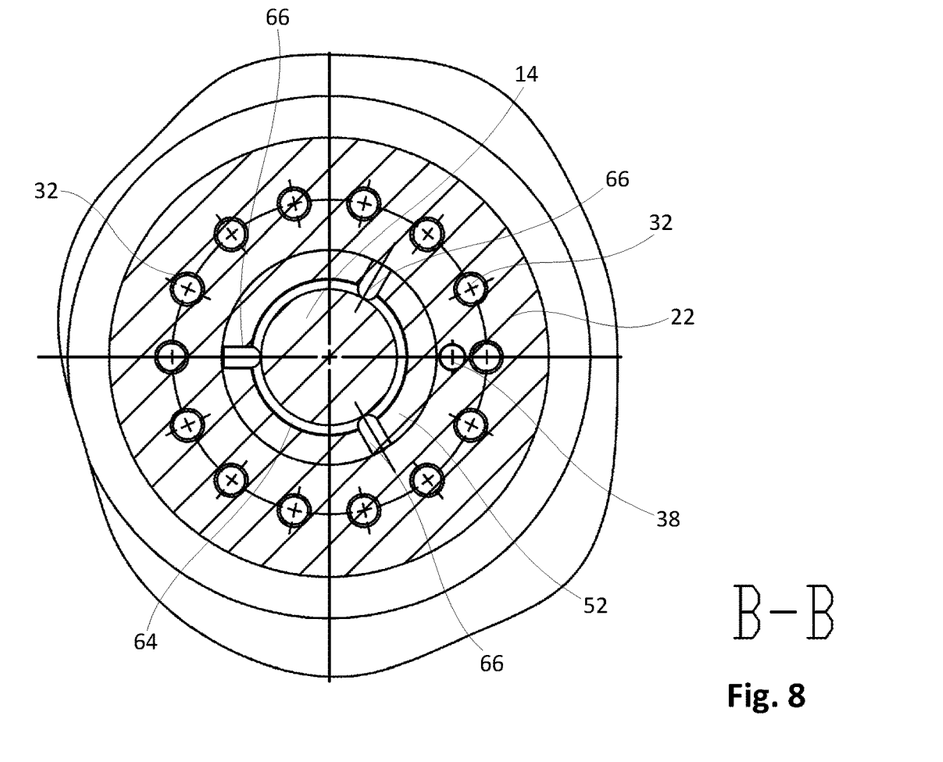
FIG. 8 is a sectional view, taken along line B-B of FIG. 7, of an inventive control valve according to the fifth embodiment of the invention.

FIGS. 7 and 8 are a sectional view of a detail of a control valve according to the invention, and a sectional view, taken along line B-B of FIG. 7, of an inventive control valve according to the filth embodiment of the invention, respectively. To secure the threaded connection 26 between the flange 22 and the valve rod 14, radially aligned grub screws 62 are provided which engage in a groove 64 on the valve rod 14 and are screwed into threaded holes 66 through the annular shoulder 52 of the flange 22.

Figure 9:
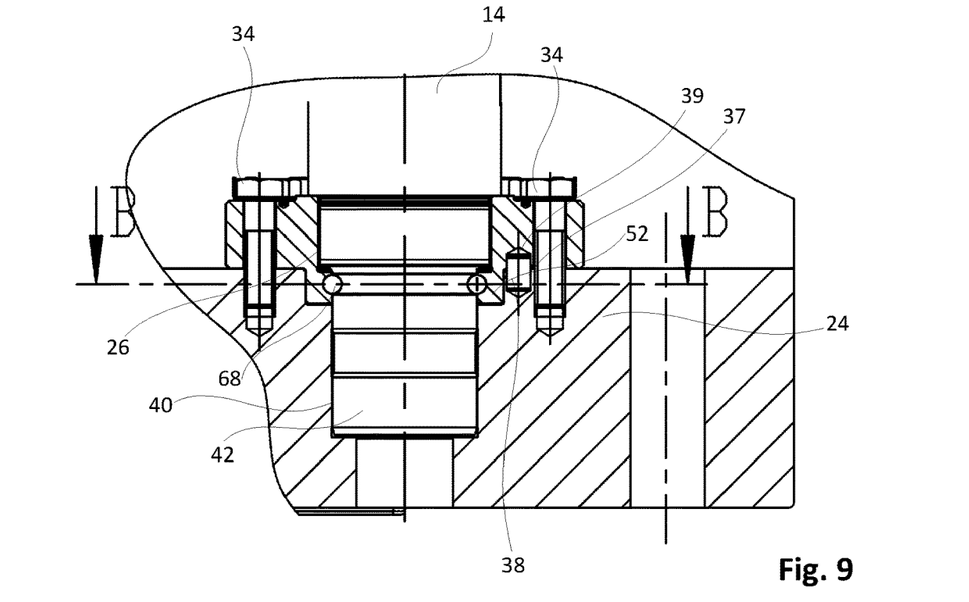
FIG. 9 is a sectional view of a detail of an inventive control valve according to a sixth embodiment of the invention.
Figure 10:
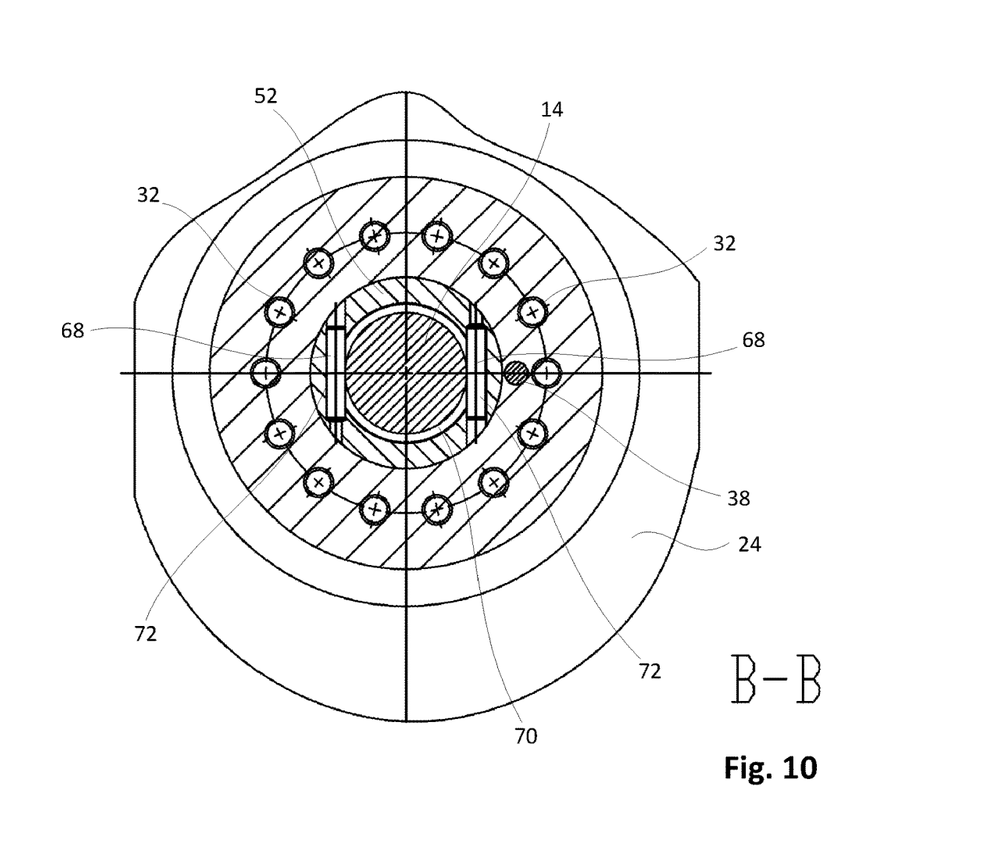
FIG. 10 is a sectional view, taken along line B-B of FIG. 9, of an inventive control valve according to the sixth embodiment of the invention.

FIGS. 9 and 10 are a sectional view of a detail of a control valve according to the invention, and a sectional view, taken along line B-B of FIG. 9, of an inventive control valve according to the sixth embodiment of the invention, respectively. To secure the threaded connection 26 between the flange 22 and the valve rod 14, two tangentially aligned threaded rods 68 are provided which engage in a groove 70 on the valve rod 14 and are screwed into threaded holes 72 through the annular shoulder 52 of the flange 22.

Figure 11:
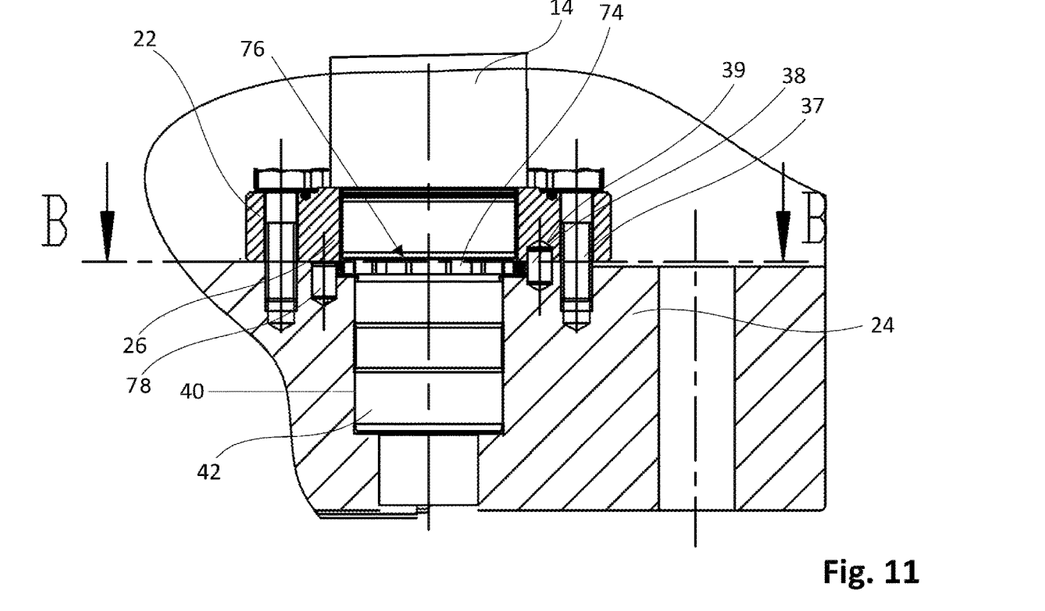
FIG. 11 is a sectional view of a detail of an inventive control valve according to a seventh embodiment of the invention.
Figure 12:
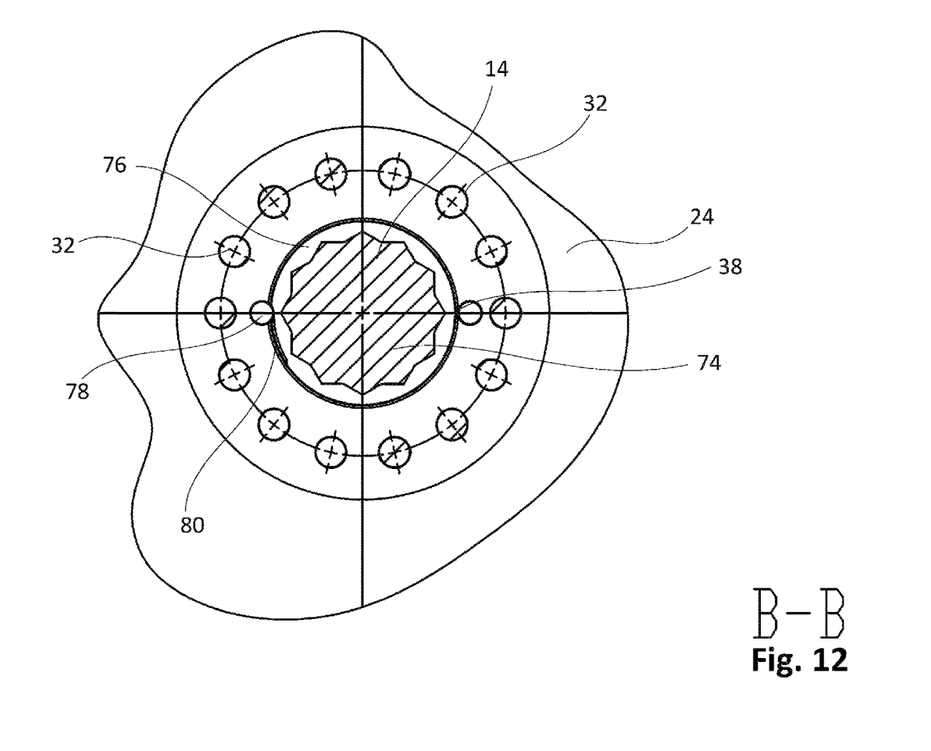
FIG. 12 is a sectional view, taken along line B-B of FIG. 11, of an inventive control valve according to the seventh embodiment of the invention.

FIGS. 11 and 12 are a sectional view of a detail of a control valve according to the invention, and a sectional view, taken along line B-B of FIG. 11, of an inventive control valve according to the seventh embodiment of the invention. To secure the threaded connection 26 between the flange 22 and the valve rod 14, a toothed section 74 with external toothing is provided on the valve rod 14, a ring gear part 76 with internal toothing matching the external toothing and a locking pin 78 are provided on the flange 22, wherein, during assembly, the locking pin 78 engages in a recess 80 on the ring gear part 76, thus locking the latter, and wherein the external toothing of the toothed section 74 of the valve rod 14 engages in the internal toothing of the ring gear part 76 after the control valve 2 has been mounted.

LIST OF REFERENCE CHARACTERS 2 control valve
4 valve housing
6 inlet
8 outlet
10 valve seat
12 valve piston
14 valve rod
16 stuffing box
18 cover
20 guide projection
22 flange
24 piston crown
26 threaded connection
30 bore
32 threaded hole
33 shoulder
34 threaded bolt
35 annular shoulder
36 weld
37 bore
38 pin
39 bore
40 fitting hole
42 cylindrical section
44 threaded hole
46 bore
48 threaded bolt
50 cone
51 conical bore
52 annular shoulder
56 snap ring
58 groove
60 groove
62 grub screw
64 groove
66 threaded hole
68 threaded rod
70 recess
72 threaded hole
74 toothed section
76 ring gear part
78 locking pin
80 recess

The invention claimed is:

1. Control valve for adjusting a process fluid flow of a process plant, comprising:
   a valve housing (4) with a valve seat (10) and a valve piston (12) connected to a valve rod (14);
   said valve piston (12) interacts with said valve seat (10) for opening and closing said control valve (2);
   said valve rod (14) is threaded (26) and connected to a flange (22), said flange (22) is mounted on and connected to said valve piston (12) by a plurality of threaded connecting elements (34);
   at least one tangentially aligned threaded rod (68) is adapted to engage a recess (70) in said valve rod (14), said recess is delimited by a secant to the valve rod (14), said threaded rod (68) being screwed into a threaded hole (72) through said annular shoulder (52) of said flange (22).

2. Control valve for adjusting a process fluid flow of a process plant, comprising:
   a valve housing (4) with a valve seat (10) and a valve piston (12) connected to a valve rod (14);
   said valve piston (12) interacts with said valve seat (10) for opening and closing said control valve (2);
   said valve rod (14) is threaded (26) and connected to a flange (22), said flange (22) is mounted on and connected to said valve piston (12) by a plurality of threaded connecting elements (34);
   external teeth (74) on said valve rod (14) engage matching internal teeth of a ring gear (76) of said flange (22);
   a locking pin (78), said locking pin resides in said valve piston (12) and engages a recess of said ring gear (76) of said flange (22) thus locking said ring gear (76) with respect to said piston (12), and said external teeth of a toothed section (74) of said valve rod (14) engages in said internal teeth of said ring gear (76).

3. The control valve according to claim 1, further comprising:
   said connecting elements (34) are distributed on a bolt circle on said flange (22).

4. The control valve according to claim 1, further comprising:
   said flange (22) has threaded holes (44);
   a piston crown (24) has holes (46) aligned with said threaded holes (44) in said flange (22); and, a plurality of threaded connecting members (48) resides in said holes (46) and engage said threaded holes (44) in said flange affixing said valve piston (12) to said valve rod (14).

5. The control valve according to claim 1, further comprising:
said flange (22) has bores (30);
a piston crown (24) has threaded holes (32) aligned with said bores (30) in said flange (22), and,
said threaded connecting elements (34) engage said threaded holes (32) affixing said flange (22) to said piston crown (24).

6. The control valve according to claim 1, further comprising:
said flange (22) is fixed to said valve rod (14) by a weld joint (36), said weld joint (36) comprising at least one weld seam in the form of a weld bead, and/or a weld spot.

7. The control valve according to claim 6, further comprising:
said flange (22) has an annular shoulder, and that said at least one welded weld joint (36) fixes said flange (22) to said valve rod (14).

8. The control valve according to claim 1, further comprising:
said valve piston (12) includes a central fitting bore (40); said valve rod (14) is centered relative to said valve piston (12) using said central fitting bore (40) in said valve piston (12) and a cylindrical shoulder on said valve rod (14).

9. The control valve according to claim 1, further comprising:
said flange (22) and said valve piston (12) are secured against rotation by at least one pin (38) inserted in respective bores (37, 39) in said flange (22) and in a piston crown (24), respectively, whereby threaded holes (32) and associated bores (30) in said flange are in alignment with one another.

10. The control valve according to claim 1, further comprising:
a centering cone (50) on said valve rod (14) and a conical bore (51) on said flange (22), said centering cone (50) is clamped against said conical bore (51), and, said valve rod (14) is affixed to said flange (22).

11. The control valve according to claim 1, further comprising:
a snap ring (56) resides in grooves (58, 60) on said valve rod (14) and/or on said annular shoulder (52) of said flange (22).

12. The control valve according to claim 1, further comprising:
at least one radially aligned grub screw (62) engages a respective groove (64) on said valve rod (14).

\* \* \* \* \*

UNITED STATES PATENT AND TRADEMARK OFFICE
CERTIFICATE OF CORRECTION

PATENT NO. : 10,948,089 B2
APPLICATION NO. : 16/151630
DATED : March 16, 2021
INVENTOR(S) : Graenz et al.

Page 1 of 1

It is certified that error appears in the above-identified patent and that said Letters Patent is hereby corrected as shown below:

In the Specification

Column 1, Line 28, before "transmitted" delete "25".

Column 2, Line 64, after the third occurrence of "the" delete "vale" and insert --valve-- therefor.

Column 3, Line 23, after "locking the" delete "later," and insert --latter,-- therefor.

Column 5, Line 10, after the first occurrence of "22" delete "ater" and insert --after-- therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*